US005356762A

United States Patent [19]

Polizzotto et al.

[11] Patent Number: 5,356,762

[45] Date of Patent: Oct. 18, 1994

[54] FILM-SHEET ASSEMBLAGE FOR PEEL-APART SELF-DEVELOPING FILM

[75] Inventors: Leonard Polizzotto, Stow; Robert J. Boyea, Wellesley Hills, both of Mass.

[73] Assignee: Polaroid Corporation, Cambridge, Mass.

[21] Appl. No.: 157,959

[22] Filed: Nov. 24, 1993

Related U.S. Application Data

[62] Division of Ser. No. 936,513, Aug. 28, 1992, Pat. No. 5,292,612.

[51] Int. Cl.[5] .......................... G03C 5/54; G03B 19/10

[52] U.S. Cl. .................................... 430/496; 430/207; 354/174; 354/178; 354/179

[58] Field of Search ............... 430/207, 208, 210, 496, 430/497; 354/174, 178, 179, 304

[56] References Cited

U.S. PATENT DOCUMENTS 3,802,887 4/1974 Sorli .................................... 430/207

OTHER PUBLICATIONS

Camera technology by Norman Goldberg published in 1992 by the Academic Press, pp. 185–187.

*Primary Examiner*—Richard L. Schilling
*Attorney, Agent, or Firm*—John J. Kelleher

[57] ABSTRACT

An improved film format for a self-developing, peel-apart film unit having flexible positive and negative sheet elements and a pod of developer liquid, wherein at least one of the sheet elements bends when a force is applied to a trailing edge thereof to effect sheet element movement. Pockets are formed on the leading end of each sheet element so that a force may be readily coupled thereto without bending either sheet element while they are being moved, for example, into a developer liquid spread system for subsequent film processing.

2 Claims, 7 Drawing Sheets

FILM-SHEET ASSEMBLAGE FOR PEEL-APART SELF-DEVELOPING FILM

This application is a division of copending application Ser. No. 07/936,513, filed Aug. 28, 1992, now U.S. Pat. No. 5,292,612.

BACKGROUND OF THE INVENTION

1. Field of the Invention

This invention relates to peel-apart film of the self-developing type, in general, and to an improved film format which will both facilitate the automated handling of such film during film processing and reduce film processing costs, in particular.

2. Description of the Prior Art

Self-developing, peel-apart film units are well known in the field of instant photography. Each film unit comprises a negative or photosensitive sheet for forming a negative image of a subject, an image receiving sheet for forming a positive subject image and a rupturable pod of processing liquid. A positive image is formed on the positive sheet by means of a well-known diffusion transfer process after the pod containing the processing liquid is ruptured and its contents spread between said positive and negative sheets.

Film units of the aforementioned type are typically exposed in portable, multiple-exposure, instant-type photographic cameras or processed in large format film processing equipment. When employed in a camera as many as ten film units are provided in a single lighttight film pack, in a stacked relation, with the positive sheet on one side and the negative sheet on the other side of a pressure plate located within the film pack. Pull tabs are attached to one or both of the leading ends of the positive and negative sheets. After exposing an outermost negative sheet at a film plane of the camera a first tab attached to the negative sheet is withdrawn from the camera forcing the exposed negative to be turned 180° about the pressure plate and into superposition with the positive sheet. This movement causes a second tab attached to the forward ends of the positive and negative sheets to enter the bite of a pair of pressure applying spread rollers. A combination of the angle at which the first tab is attached and the force applied by a camera operator causes the first tab to detach from the negative sheet at this time.

After the first tab is so detached, the operator pulls the second tab so as to advance the positive and negative sheets between the pair of spread rollers in a superposed relation. At the beginning of the advancement of the positive and negative sheets the spread rollers apply pressure to a pod containing a processing liquid located at the leading ends thereof, thereby rupturing same, and spreading its contents between the superposed sheets in a thin uniform layer as the sheets are advanced therebetween. A positive image is formed on the positive sheet outside of the camera by a diffusion transfer process. After a required interval of time the positive image is peeled away from its negative and the negative, along with the second tab attached thereto are discarded. A more detailed description of this particular type of peel-apart film may be found at pages 185–187 of a book entitled, "Camera Technology" by Norman Goldberg published in 1992 by the Academic Press.

The above-described peel-apart film format has several disadvantages, especially if considered for use in certain photographic apparatus. One disadvantage is film cost. In addition to the multiple tabs and the relatively large amounts of leader material required for each film unit, which necessarily increases material costs, economies of scale are limited by the fact that both a positive and a negative sheet must be included within a single film cassette. Including significantly larger numbers of film units within a single cassette in order to take advantage of such economies, would substantially increase cassette size and thereby make such a cassette unwieldy for use by a camera operator. Another disadvantage is that this type of film format is not susceptible of inclusion in highly automated film processing equipment. Processing a film unit by pulling certain tabs at various times in the film processing cycle is clearly a processing technique that is inherently manual.

As noted above, self-developing, peel-apart film units of the aforementioned type are also processed in large format, film processing equipment. These film units are similar in format and construction to the large format color film marketed by Polaroid Corporation under the trade designation Type 800 Land Film. This large format film and a portion of the equipment employed to process such film are shown in prior art drawing FIGS. 1 and 2. As shown in FIGS. 1 and 2, a peel-apart, self-developing, large format film unit 10 comprises a photosensitive or negative sheet element 12 and a nonphotosensitive or positive sheet element 14. The negative sheet element 12 includes a leader 16 with a rear-facing, pocket-like opening 18 having a forward projecting tab 20. An opaque envelope 22, sealed on three sides, encloses the bottom or photosensitive surface 23 of the negative sheet element 12 to prevent its exposure to ambient light. The positive sheet element 14 has a non-photosensitive image-receiving or coating layer 24 and a rupturable pod 25 attached to a leader 26 which is folded back on itself on the image-receiving layer side thereof and is adhesively maintained in this folded condition. A slot 28 formed in the fold of the leader 26 is adapted to receive the tab 20 of the negative sheet element 12.

A lighttight cassette 30 (FIG. 2) is provided for enclosing the opaque envelope 22 and the negative sheet element 12 included therein. The cassette comprises a base housing member 32 and a cover 34 having an exposure opening therein (not shown) which is pivotally movable with respect to the base 32 about a hinge 36. A tab 38 is mounted in a fixed position within the base member 32 of the cassette 30. To load the cassette 30 the opaque envelope 22 together with the negative sheet element 12 included therein is placed within the base housing member 32 such that the tab 38 enters the pocket-like opening 18 of said negative sheet element 12. In this position the tab 20 portion thereof projects beyond the forward end of the base housing member 32 and a portion of the envelope 22 extends beyond the rear or opposite end thereof via a lighttight opening 40. When the cover 34 is placed in its closed position, a lighttight chamber is formed within the cassette 30. The envelope 22 is then removed from the negative sheet element 12 through the lighttight opening 40 in the cassette 30. Negative sheet element 12 is prevented from being withdrawn with the opaque envelope 22, because of the pocket-like opening 18 of the negative sheet leader 16 being engaged by the fixedly mounted tab 38.

The cassette 30 includes a displacable dark slide (not shown) in the cassette cover 34. The dark slide is temporarily displaced in order to subsequently expose the photosensitive layer of the negative sheet element 12 to scene light through exposure control and lens systems in an appropriate photographic camera, to form a subject image thereon. The dark slide is then replaced over the photosensitive layer and the cassette 30 with the negative sheet element 12 included therein is removed from the camera.

To process an exposed negative, the positive sheet element 14 is placed in a generally flat, horizontal tray 42 of a conventional large format film processor 44 with its image-receiving layer 24, rupturable pod 25 and the folded portion of the leader 26 facing upward. The cassette 30 is placed on top of the processor tray 42 with the exposed photosensitive layer of the negative sheet element 12 facing the image-receiving layer of the positive sheet element 14. Cassette 30 is then moved forward by a processor operator until the forward projecting tab 20 of the negative sheet element 12 enters the slot 28 in the positive sheet element leader 26 to the point where the shoulder portions 46A, 46B thereof engage the crease in the fold formed in the leader 26 and where the leading end of said tab 20 engages the bite of a pair of motor driven processing rollers 48A, 48B (motor not shown). When the motor that drives the processing rollers is energized, the negative sheet element tab 20 together with the engaged positive and negative sheet elements 12 and 14 are drawn into the rollers 48A, 48B to initiate film processing. The initial movement of the tab 20 by the rollers 48A, 48B causes the photosensitive layer on the negative sheet element 12 and the image-receiving layer on the positive sheet element 14 to be moved into longitudinal registration with one another. As the negative and positive sheet elements 12 and 14 are drawn through the spread rollers 48A, 48B, the pod of processing liquid 25 is ruptured thereby and its contents are uniformly spread between the photosensitive layer on the negative sheet element 12 and the image-receiving layer on the positive sheet element 14 to initiate the formation of a positive image. When the required amount of image formation time has elapsed the positive sheet is peeled from the negative sheet and the negative sheet together with a mask and leaders from both sheets are discarded.

Large format film material costs are somewhat lower than that of the above-described multiple pull-tab, peel-apart film due primarily to a reduction in the size of the leader on the positive sheet element 14. However, the leader design of both such negative sheet elements is comparable which should make the cost of comparably sized negatives more or less equivalent. More importantly though, the format employed in this large format type of film has inherent undesirable features which render it unsuitable for use with highly automated film processing equipment for peel-apart self-developing film. One such undesirable feature is the location of the rupturable pod of processing liquid 25 on the positive sheet element 14. In addition to its susceptibility to being damaged by the tab 20 of the negative sheet element 12 when tab 20 is inserted into the slot 28 in the leader 26 of the positive sheet element 16, the location of the pod 25 sometimes causes the leading end of the tab 20 to become trapped between said pod 20 and an adjacent surface of the leader 26 as it is being moved toward the leader slot 28 by the equipment operator to thereby cause a film unit misfeed within the film processing equipment.

Another undesirable feature associated with the above-described large format color film is the requirement that one sheet element thereof be moved or transported by the other when both are moved into the bite of a pair of spread rollers to initiate film processing. As described above, in order to produce such simultaneous movement, each large format film sheet element requires a different type of force transmitting means. The negative sheet element is moved by the spread rollers 48A, 48B when the tab 20 of the negative sheet element 12 enters the bite thereof, whereas the positive sheet element is moved only when its leader 26 is engaged by shoulder portions 46A, 46B of the negative sheet leader 16. Requiring two different types of force transmitting means within a film processor wherein, for example, it is desirable to introduce both positive and negative sheet elements of a self-developing peel-apart film unit into the processor from separate film cassettes, could increase film processor complexity and manufacturing costs over an arrangement where only a single type of force transmitting means need be employed.

At this point it should be noted that self-developing integral film such as that marketed by Polaroid Corporation under the trade designation "Spectra Film" is also moved into a developer liquid spread system by a force transmitting member incorporated within certain photographic apparatus. The force transmitting member (sometimes referred to as a "pick") engages the trailing edge of the integral film unit, after film exposure, and moves the leading edge thereof into the bite of a pair of processing rollers. However, this method of integral film movement would not be appropriate for moving sheet elements of a peel-apart film unit, such as that described above, into a developer spread System. This is so because a negative sheet element, and to a lesser extent a positive sheet element, lack the degree of stiffness necessary for a force transmitting member to be able to consistently position one sheet element of a peel-apart film unit in an overlaying relation with respect to another sheet element, for subsequent film unit processing, with the application of a force to the trailing edge of either of said sheet elements.

SUMMARY OF THE INVENTION

In accordance with the teachings of the present invention an improved film format for a self-developing, peel-apart film unit is provided. The film unit incorporating the film format comprises a negative sheet element having a photosensitive layer and having a leader at one end thereof, a positive sheet element having an image-receiving layer and a leader at one end thereof and a rupturable pod of processing liquid located on said positive sheet leader on the same side as said image-receiving layer. A pocket is formed on the leaders of both the positive and negative sheet elements for engagement by a force transmitting member for movement therewith. The pocket may be located on either side of the negative sheet leader but must be located on the positive sheet leader on a side opposite said rupturable pod. This pocket arrangement reduces the amount of leader material required by the positive and negative sheet elements, facilitates sheet element movement out of a cassette and into an automatic film processor without compressing either sheet element during such sheet movement and enables large numbers of negative sheet elements to be included within a cassette which substantially increases the number of images which can be made with a cassette-fed, peel-apart film camera than was heretofore possible.

It is a primary object of the present invention, therefore, to provide a film format for self-developing, peel-apart film which will substantially reduce the manufacturing and processing costs of such film.

It is another object of the present invention to provide a film format for self-developing, peel-apart film which will facilitate its movement out of a film cassette and into automatic film processing equipment without compressing and thereby bending sheet element components thereof.

It is a further object of the present invention to provide a film format for a self-developing film unit which will enable a camera operator to make larger numbers of photographic images with a cassette-fed, peel-apart camera from a single pack of film than was heretofore possible.

Other objects, features and/or advantages of the present invention will be readily apparent from the following detailed description of a referred embodiment thereof when taken in conjunction with the accompanying drawings.

DESCRIPTION OF THE PREFERRED EMBODIMENT

Figure 1:
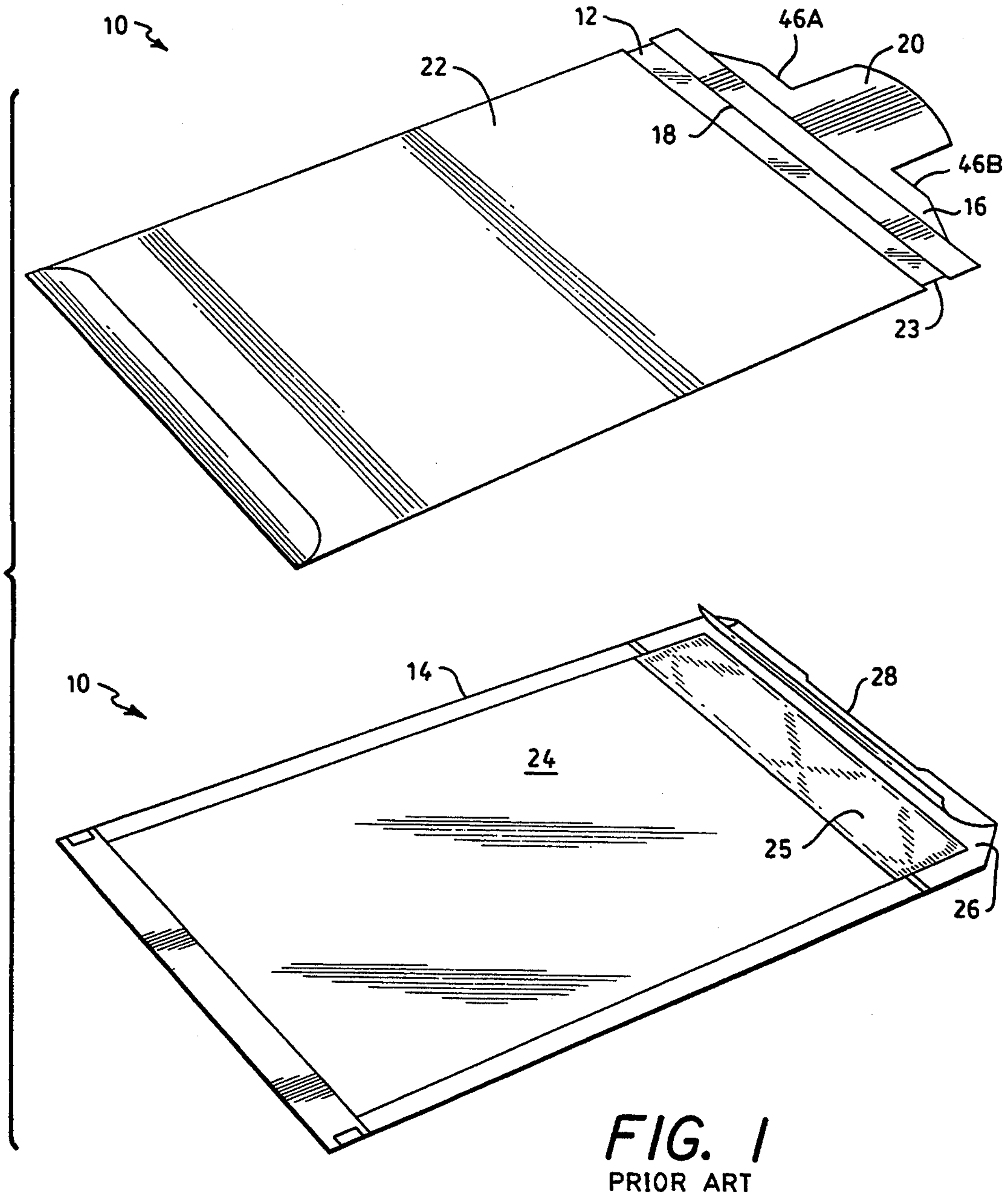
FIG. 1 PRIOR ART
FIG. 1 is a perspective view of a large format film unit comprising a positive sheet element having a leader with a slot formed therein and a pod of developer fluid attached thereto together with a negative sheet element enclosed in a light blocking opaque envelope and having a tab projecting from the leading end thereof for insertion in the slot in said positive sheet element leader in accordance with the prior art.
Figure 2:
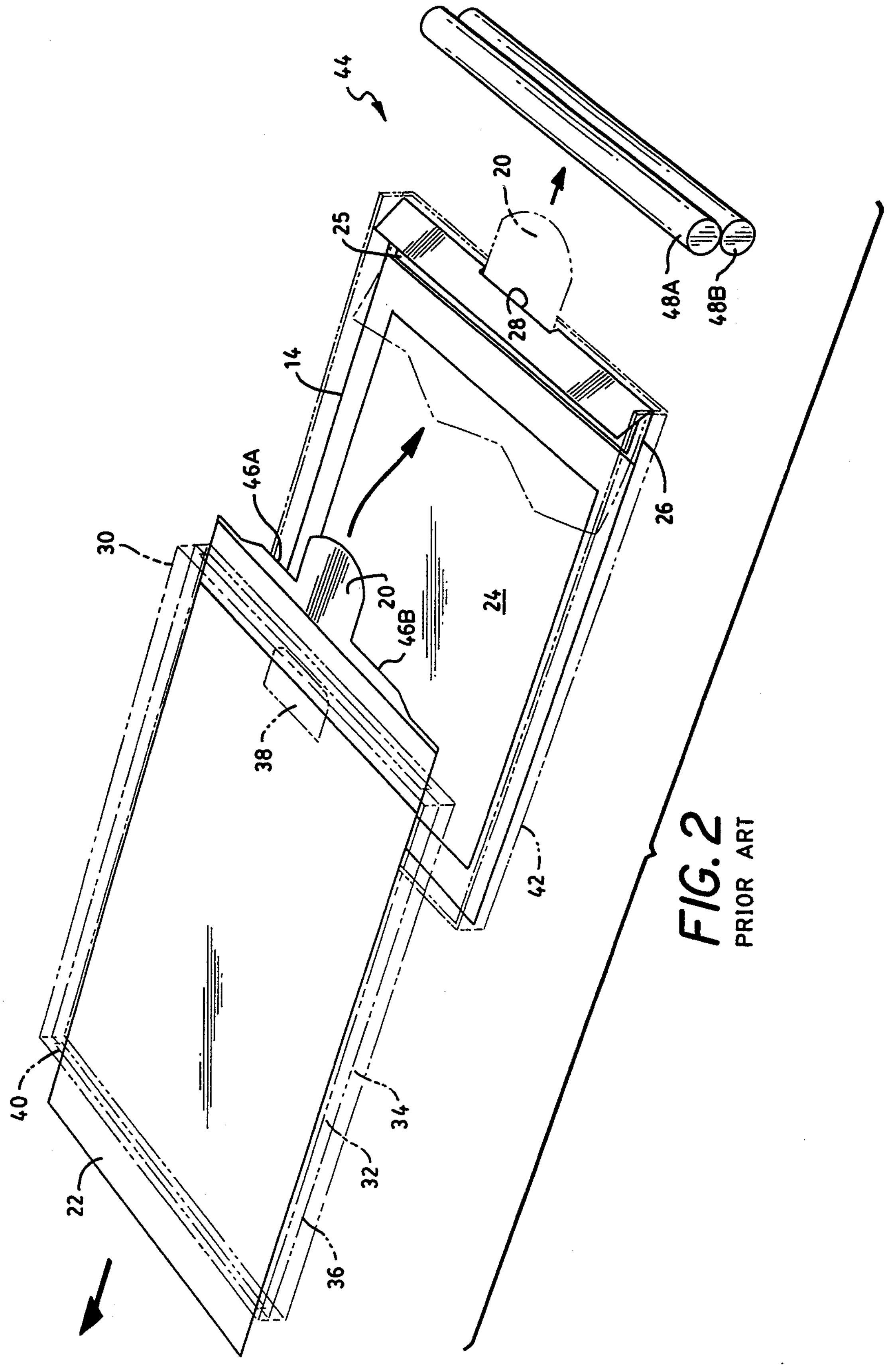
FIG. 2 PRIOR ART
FIG. 2 is a perspective view of a cassette-enclosed negative sheet element being placed into registration with a processor tray supported positive sheet element for subsequent insertion into the bite of a pair of processing rollers in accordance with the prior art.
Figure 3:
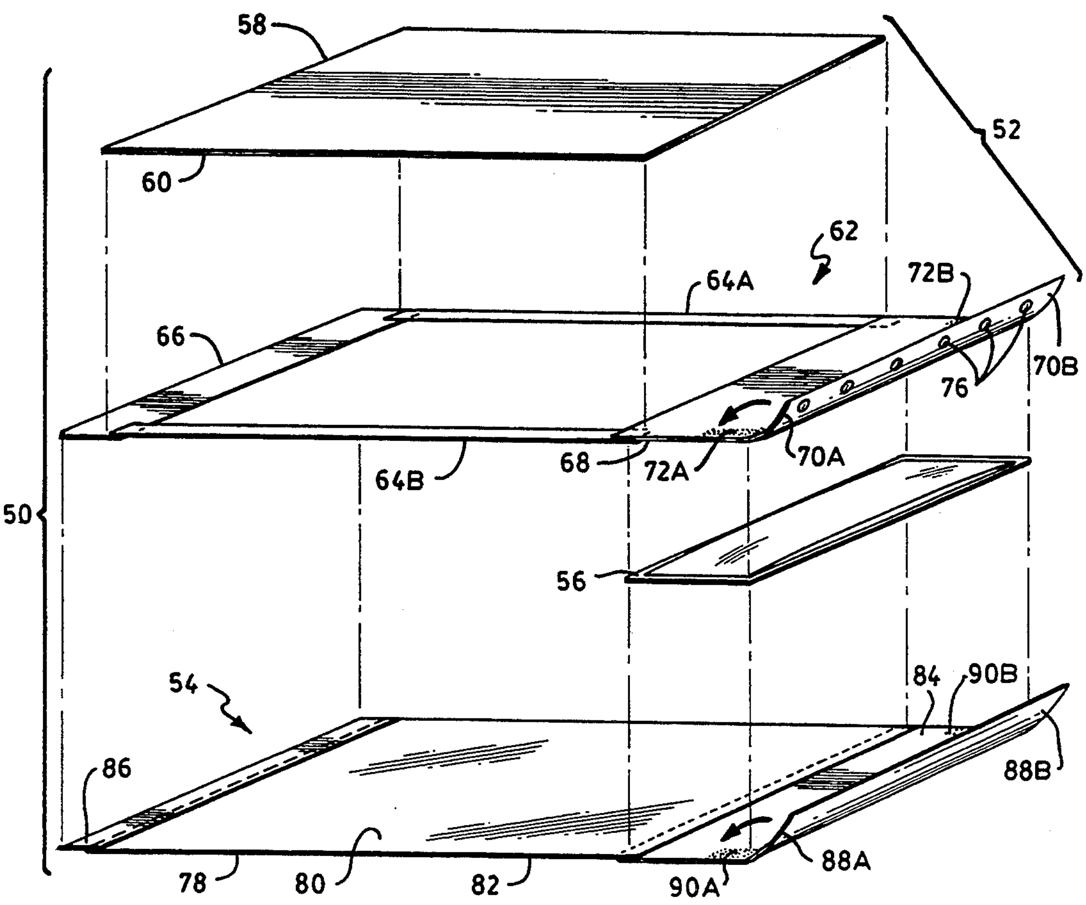
FIG. 3 is an exploded perspective view of the component parts of a self-developing peel-apart film unit incorporating the improved film format of the present invention.
Figure 4:
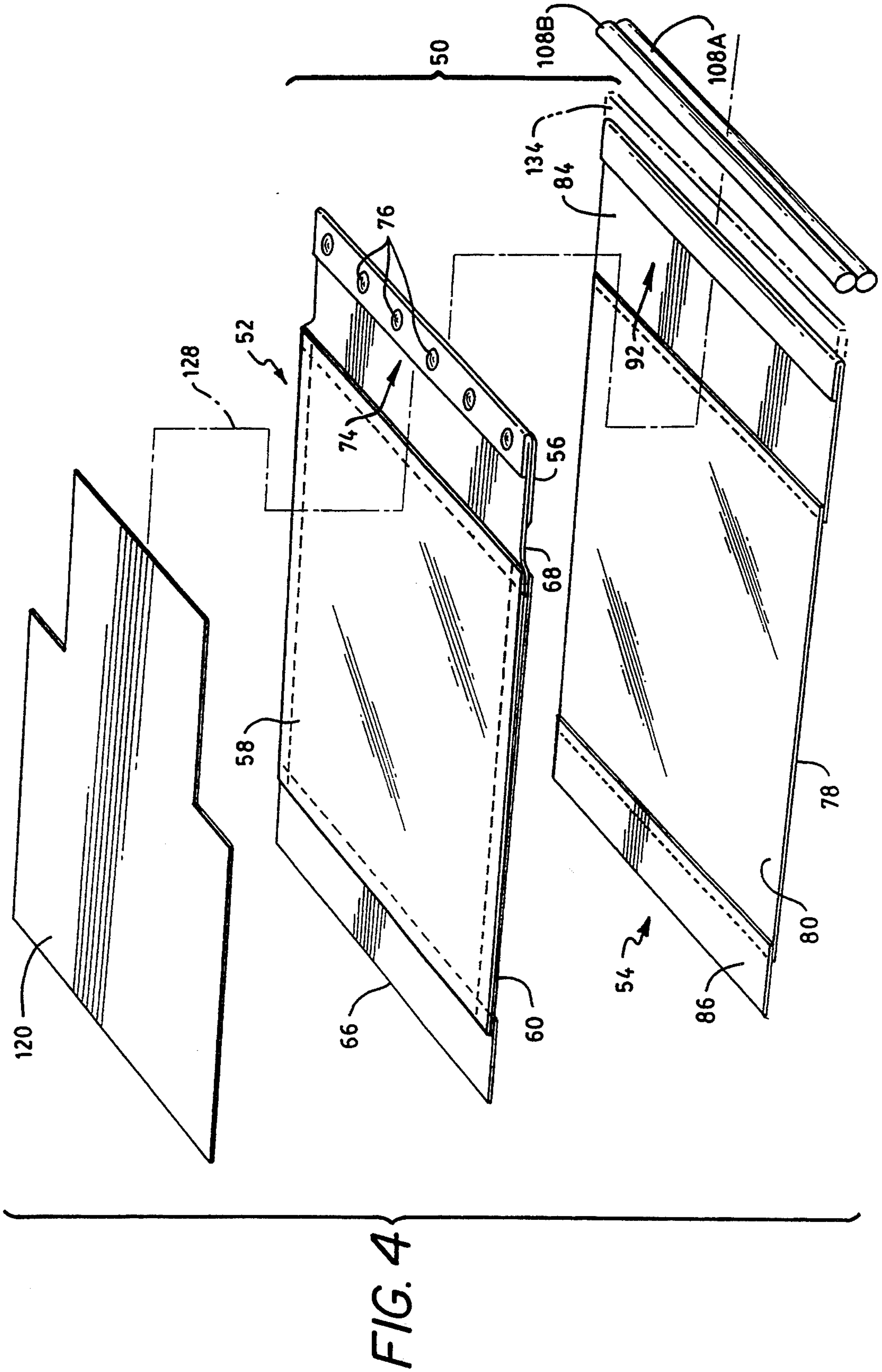
FIG. 4 is a perspective view of a film unit incorporating the film format of the present invention wherein the leading end of one sheet element is inserted into a pocket in the leading end of another sheet element for movement into a developer fluid spread system by a force transmitting member.

Referring now to the drawings, and specifically to FIGS. 3 and 4, there is shown exploded and partially compact perspective views, respectively, of a self-developing peel-apart film unit 50, incorporating the improved film format of the present invention. The film unit 50 comprises a positive sheet element 52, a negative sheet element 54 and a rupturable pod of processing liquid 56. The positive sheet element 52 includes a rectangular sheet 58, formed of a polyester material, which has an image-receiving layer 60 applied to the bottom surface thereof.

Positive sheet element 52 also includes a frame or image mask 62 for adhesive attachment to the border area of polyester sheet 58, on the image-receiving layer side thereof. The mask 62 is comprised of four separate pieces which include a pair of side strips 64A, 64B, a trailing strip 66 and a leader 68. The leading end of the leader 68 is folded back on itself and the sides 70A, 70B thereof are adhesively attached to the sides 72A, 72B, respectively, of the leader 68 to form a pocket 74 (FIG. 6) on one side thereof. A series of inwardly projecting raised portions or dimples 76 are formed in the side of the leader pocket in order to maintain a minimum size opening so that a force transmitting member may be readily inserted therein. The pod of processing liquid 56 is adhesively attached to a surface of the leader 68 on the side opposite the pocket 74.

The negative sheet element 54 includes a rectangular sheet 78, formed of a polyester material, which has a photosensitive layer 80 applied to the top surface and a carbon-based opacifying layer 82 applied to the bottom surface. A leader 84 is adhesively attached to the leading end and a trailing strip 86 is adhesively attached to the trailing end of the polyester sheet 78. Both the leader 84 and the trailing strip 86 are made of paper. The leading end of the leader 84 is folded back on itself, on the same side as the photosensitive layer 80 of the negative sheet element 54, and the sides 88A, 88B thereof are adhesively attached to the sides 90A, 90B, respectively, of the leader 84 to form a pocket 92.

Figure 5:
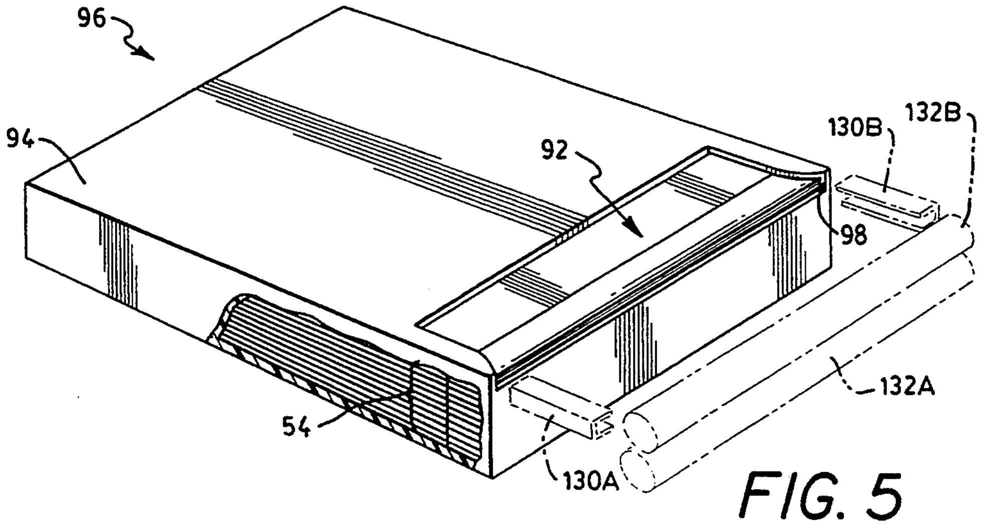
FIG. 5 is a partially broken away perspective view of a lighttight film cassette containing a plurality of negative sheet elements incorporating certain portions of the film format of the present invention and additionally showing mechanical means for maintaining a negative sheet leader in its folded condition.

With additional reference to FIG. 5, a plurality of exposed negative sheet elements 54 are transferred from photographic apparatus (not shown) in which they were exposed, by a transfer mechanism (not shown), into a lighttight cassette 94, in a stacked relation. The pockets 92 of the negative sheet elements 54 are positioned in an upward facing orientation as shown in FIG. 5. The exposed negative sheet elements 54 were serially inserted into the cassette 94 through an entrance slot 96 in one end thereof. The cassette 94 also includes a spring (not shown) located at the bottom of the stacked negative sheet elements 54 for successively urging each of said sheet elements into alignment with a cassette exit slot 98.

Figure 6:
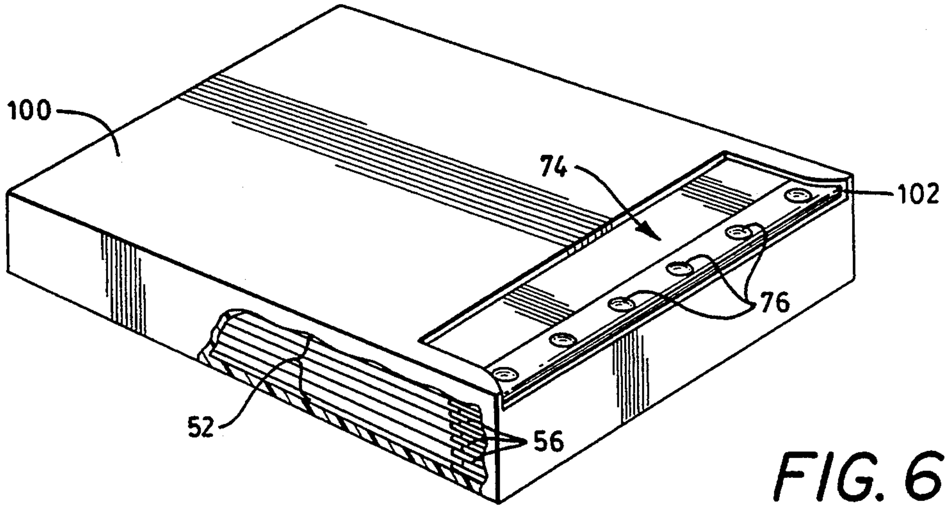
FIG. 6 is a partially broken away perspective view of a film cassette containing a plurality of positive sheet elements incorporating a portion of the film format of the present invention with each such sheet element having a pod of developer liquid attached thereto.

A plurality of positive sheet elements 52, each having a pod 56 of developer liquid attached thereto in the manner described above, are placed within a cassette 100 during film manufacturing, in a stacked relation as shown, for example, in drawing FIG. 6. The cassette 100 is similar in many respects to the negative sheet element enclosing cassette 94 shown in FIG. 5. The primary differences between these two cassettes is the lack of a requirement that positive cassette 100 be light-tight and the absence of an entrance slot for insertion of a positive sheet element therethrough. The pockets 74 of the positive sheet elements 52 together with the dimples 76 formed therein are positioned in an upward orientation and the pods 56 of developer liquid located on the leading end of each of said positive sheet elements on a side opposite the pockets 74, are in a downward facing orientation. Like the cassette 94, the cassette 100 includes a spring (not shown) located at the bottom of the stacked positive sheet elements 52 for successively urging each of said sheet elements into alignment with an exit slot 102.

Figure 7:
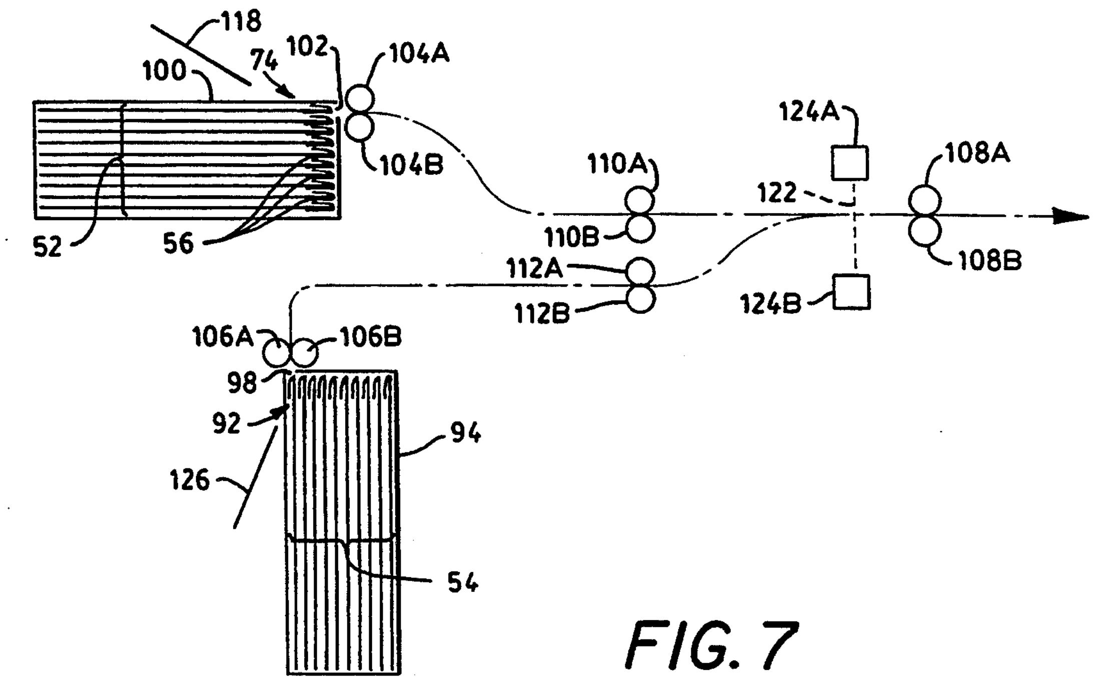
FIG. 7 is a top view of a preferred embodiment of a transport system for transporting positive and negative sheet elements of a self-developing film unit incorporating the film format of the present invention, from their respective cassettes and into a developer liquid spread system of a film processor.

A positive sheet element 52 and an exposed negative sheet element 54 are transported into a film processor spread system for registration and subsequent processing, in the following manner. As shown in FIG. 7, which is a top view of a transport system and spread roller for the film processor, a positive sheet element containing cassette 100 and a negative sheet element containing cassette 94 are placed in the film processor adjacent a pair of cooperating transport rollers. The exit slot 102 of the positive sheet element enclosing cassette 100 is adjacent a pair of cooperating motor (not shown) driven transport rollers 104A, 104B, and the exit slot 98 of the negative sheet element enclosing cassette 94 is adjacent another pair of transport rollers 106A, 106B

Figure 8:
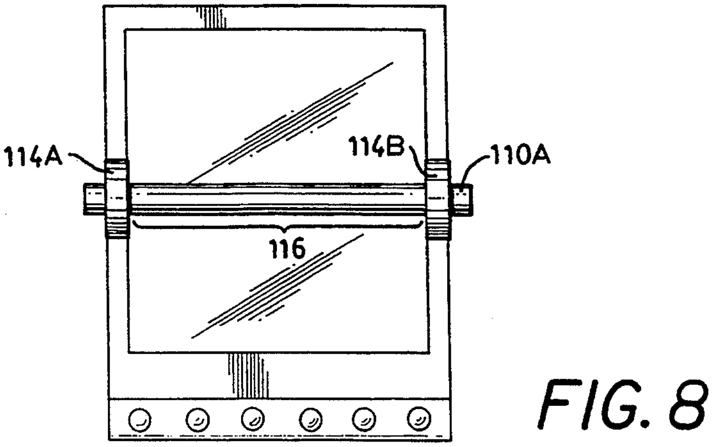
FIG. 8 is an elevational of a film transport roller transporting a positive sheet element.

A positive sheet element transported by the transport rollers 104A, 104B toward a pair of adjacent spread rollers 108A, 108B, is further transported by another pair of cooperating motor (not shown) driven transport rollers 110A, 110B. Also, a negative sheet element transported by the transport rollers 106A, 106B, toward said spread rollers 108A, 108B, is further transported by another pair of cooperating transport rollers 112A, 112B. As shown for example, in FIG. 8, each of the cooperating pairs of transport rollers have raised and portions 114A, 114B at each end thereof. When rotated, a pair of adjacent raised transport roller end portions cooperatively grip a positive or a negative film sheet inserted therebetween and thereby move a film sheet toward the spread rollers 108A, 108B. A center portion 116 of the transport rollers 110A, 110B, for example, is sufficiently spaced from the film sheet being transported to avoid rupturing a pod of developing liquid such as that being carried by a positive sheet element 52.

A manually activated control system (not shown) initially causes a force transmitting member or pick 118 (FIG. 7) to engage the pocket 74 on the uppermost sheet element 52 within the positive cassette 100 and move it into the bite of the transport roller pair 104A, 104B. The pick 118 is similar in shape to a pick or force transmitting member 120 shown in FIG. 4 which is constructed from a relatively thin sheet of metal. Transport roller pair 104A, 104B then move the sheet element 52 into the bite of the transport rollers 110A, 110B which, in turn, move a leading edge thereof to a location 122. This is accomplished by a pair of position sensors 124A, 124B that sense when the leading edge thereof is so positioned and generates a first signal in response thereto which temporarily interups the rotation of the drive motor of the transport rollers 110A, 110B.

In a similar manner, the manually activated control system also causes a force transmitting member or pick 126 to engage the pocket 92 on the uppermost sheet element 54 within the negative film cassette 94 and move it into the bite of the transport roller pair 106A, 106B. The pick 126 is similar in shape to pick 118 described above for use in conjunction with positive film cassette 100. Transport roller pair 106A, 106B then move the sheet element 54 into the bite of the transport roller pair 112A, 112B which, in turn, move a leading edge thereof to the location 122. This is also accomplished by the pair of position sensors 124A, 124B which sense when the leading edge of the negative sheet element is so positioned and generates a second signal in response thereto which temporarily interups the rotation of the drive motor of the transport rollers 112A, 112B. When the leading edges of the positive sheet element 52 and the negative sheet element 54 are positioned to location 122 as determined by the sensors 124A, 124B, the photosensitive portion on one sheet will be in registration with the image-receiving portion on the other sheet. When this occurs, the control system activates the motors that drive the transport roller pair 110A, 110B and the transport roller pair 112A, 112B. When so activated these roller pairs cause a positive sheet element 52, a negative sheet element 54 and a pod of developer liquid 56 supported on the positive sheet element 52 (collectively referred to herein is a film unit 50 ) to be transported into the bite of the pair of processing rollers 108A, 108B. The processing rollers 108A,-108B, in turn, rupture the pod of processing liquid 56 and spread its contents between the photosensitive layer on the negative sheet element and the image-receiving layer on the positive sheet element to thereby initiate image processing by means of a well-known dye-diffusion transfer process. After the requisite amount of processing time has elapsed, that portion of the positive sheet element containing the transferred positive image is peeled from the negative sheet element and the paper mask forming a portion of the positive sheet element, to thereby reveal a fully developed positive image.

As explained above, the pockets 74 and 92, respectively incorporated in positive and negative sheet elements 52 and 54, are maintained in their pocket configurations by an adhesive applied to the pocket edges. It should be noted that this pocket configuration can also be maintained by mechanical means such as channel members 130A, 130B shown in outline form in drawing FIG. 5. The channels 130A, 130B would be interposed between, for example, the exit slot 98 of the film cassette 94 and a pair of spread (or transport) rollers 132A, 132B and would be the equivalent of the adhesive mentioned above for maintaining the folded configurations of the pockets 74 and 92. The channels 130A, 130B would provide the same function as the adhesive which is to prevent the pockets 74 and 92 from straightening out and thereby prevent the uncoupling of any force being applied to a positive or negative sheet element.

Alternatively, the positive and negative sheet elements may be transported from the film cassettes 94 and 100 in a different and less preferred manner. Referring again to FIG. 4, the positive sheet element 52, which may be considered the uppermost sheet element in a positive film cassette, is positioned above the negative sheet element 54, which may be considered the uppermost sheet element in a negative film cassette, are vertically displaced and are in lateral alignment with one another. Force generating means (not shown) causes the force transmitting member or pick 120 to move forward along a schematically represented path 128. The leading end of the forward moving force transmitting member 120 is inserted into the pocket 74 of the positive sheet element 52 which are then collectively inserted into the pocket 92 of the negative sheet element 54. The force transmitting member 120, the positive sheet element 52 and the negative sheet element 54 continue their movement along the path 128 until the leading end of the negative sheet element 54 enters the bite of the spread rollers 108A, 108B. When the leading end of the negative sheet element 54 is so inserted, the force transmitting member 120 is withdrawn from the pocket 74 of the positive sheet element 52 and then the spread rollers 108A, 108B, which are then caused to rotate, will initiate the film developing process by drawing the positive and negative sheet elements therebetween, rupturing the developer liquid containing pod 56 and spreading its contents between the appropriate photographic layers of sheet elements 52 and 54 in the above-described manner. It should be noted that this film element transport technique would be equally applicable to an arrangement where the leading end of the negative sheet element 54 was inserted into the pocket 74 in the positive sheet element 52 by the pick 120. It should also be noted that in this alternate embodiment the longitudinal or overall external length but not the internal depth of the pocket 92 would have to be extended as shown in outline in FIG. 4, the extension being designated reference numbered 134 therein. This extension is necessary in order to prevent the leading end of the force transmitting member 120 from being inserted between the spread rollers 108A, 108B together with the pocket 74 and possibly damaging these rollers.

Figure 9A:
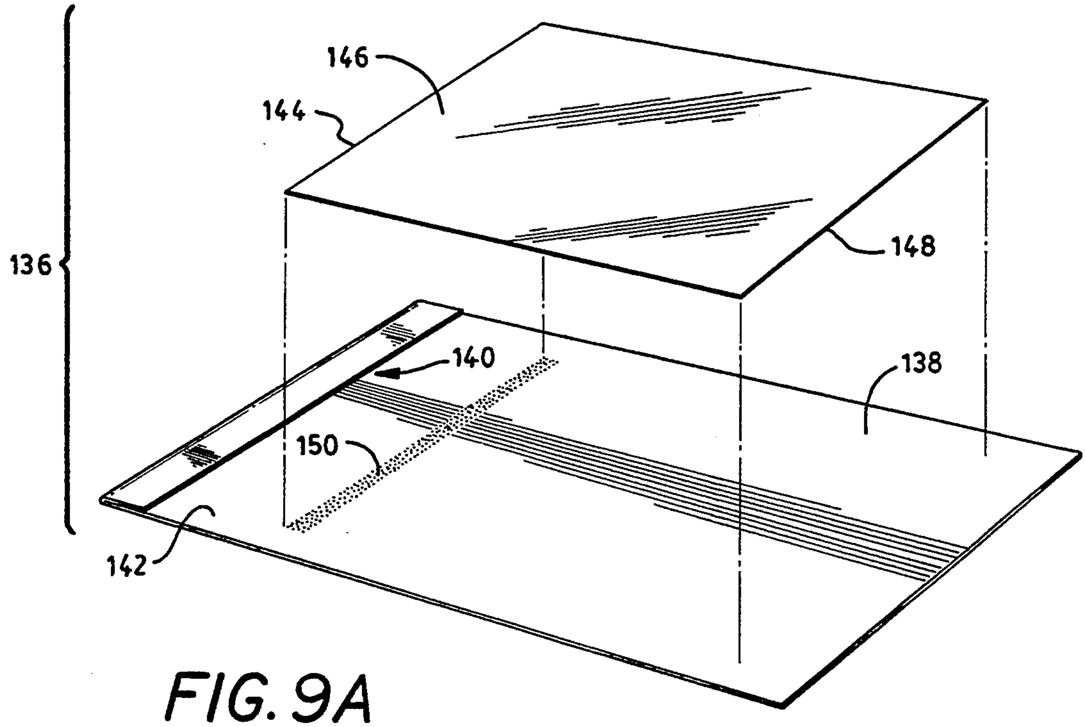
FIG. 9A is an exploded perspective view of a negative sheet element for a peel-apart film unit incorporating the improved film format of the present innovation wherein the photosensitive layer thereof is supported by a carrier sheet.
Figure 9B:
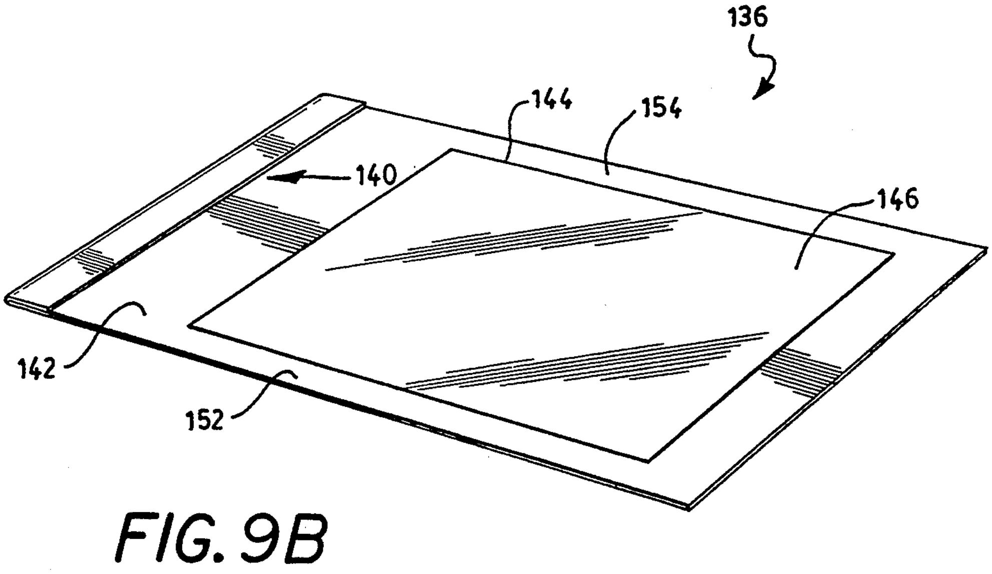
FIG. 9B is an assembled perspective view of the negative sheet element of FIG. 9A.

In the preferred embodiment, the negative sheet element 54 of the self-developing peel-apart film unit 50 (FIG. 4) is described as being formed of three basic parts. One part is a rectangular sheet 78 of polyester material having certain layers of material thereon. The other two parts are a leader 84 and a trailing strip 86 which are made of paper and are adhesively attached to the leading and trailing ends, respectively, of the rectangular sheet 78. However, an alternate negative sheet element 136 shown in FIGS. 9A and 9B may also be employed in place of the negative sheet element 54 in self-developing peel-apart film unit 50. FIGS. 9A and 9B show this alternate negative sheet element 13E; in exploded and assembled perspective views, respectively.

Alternate negative sheet element 136 includes a carrier sheet 138, made of paper, having a pocket 140 formed on a side of a leading end 142 thereof in the same manner as pocket 92 is formed on the side of the leading end 84 of the negative sheet element 54, in the preferred embodiment. Sheet element 136 additionally includes a rectangular sheet 144, formed of a polyester material, having a photosensitive layer 146 applied to a top surface and a carbon-based opacifying layer 148 applied to a bottom surface. A leading end of the opacifying-layer of the polyester sheet 144 is adhesively attached to the carrier sheet 138 near the pocket 140 thereof. Except for the adhesively attached portion, the rectangular photosensitive sheet 144 is free to move with respect to the carrier sheet 138.

The size and location of the rectangular photosensitive sheet 144 are such that when positioned on the carrier sheet 138 additional space is provided by the sides 152 and 154 of said carrier sheet 138 to collect any excess developer liquid or reagent spread between adjacent positive and negative sheet elements. In addition to this increase in the excess developer liquid collecting space, advantages resulting from the alternate negative sheet element 136 are reduced manufacturing complexity, the separation or isolation of one negative sheet element from another when in a stacked relation which avoids the possibility of one adjacent negative sheet element sticking to another and the improved flatness of the rectangular photosensitive sheet created by the carrier sheet which will help maintain the photosensitive sheet in the film plane of the photographic apparatus in which it is exposed and thereby improve the extent to which the resulting image is focused.

Figure 10:
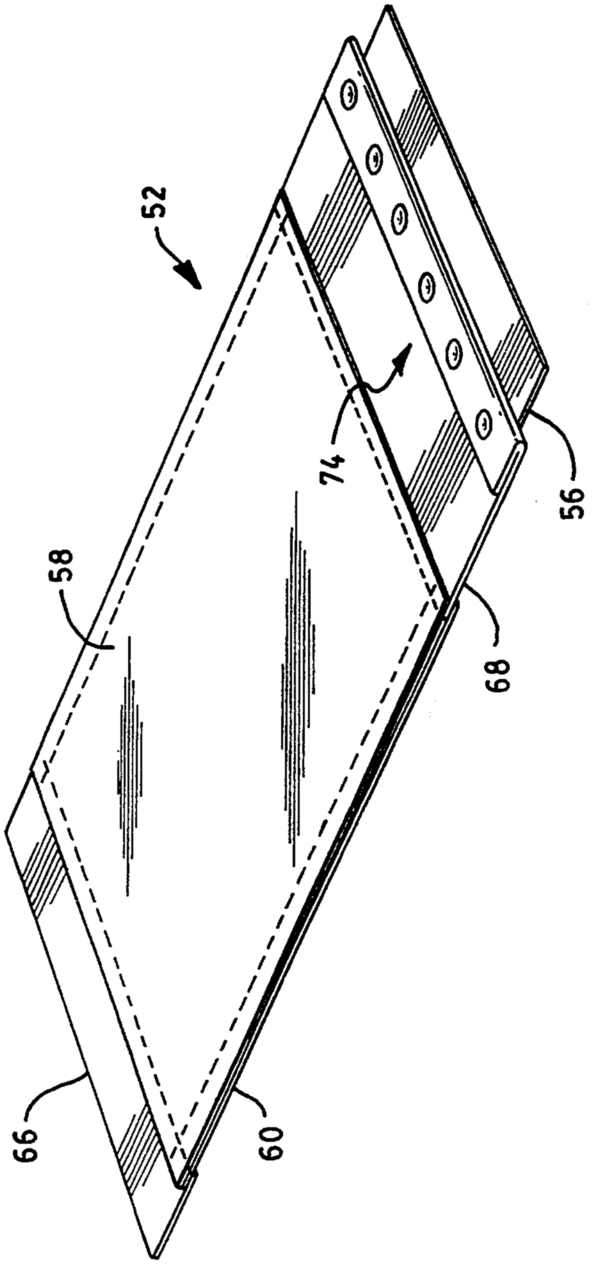
FIG. 10 is a positive sheet element for a peel-apart film unit incorporating the improved film format of the present invention having a rupturable pod of developer liquid attached to and extending beyond a leading end thereof.

Also, in an alternate technique for transporting positive and negative sheet elements into a developer liquid spread system, described above with respect to FIG. 4, the leading end of the positive sheet element 52 was inserted into the pocket 92 of the negative sheet element 54 by the force transmitting member 120 for their collective movement into the developer liquid spread system. This arrangement necessitated a reduction in the width of the leading end of the positive sheet element 54 so that it would be able to enter the negative sheet element pocket 92. Reducing the width of the positive sheet element 54 for this purpose is an additional manufacturing step which increases positive sheet element production costs. An alternate arrangement that avoids the necessity for making such a leading end width reduction is shown in FIG. 10. In FIG. 4 as well as FIG. 10, it can be seen that the width of the rupturable pod 56 is such that it is capable of entering the pocket 92 in the negative sheet element 54 without any modification. Therefore in the alternate arrangement of the positive sheet element 52 shown in FIG. 10, the rupturable pod 56 is adhesively attached thereto such that it extends beyond the leading end thereof and is therefore readily capable of entering the pocket of the negative sheet element 54 for negative sheet element 54 transport purposes without having to reduce the width of the leading end 68 of the positive sheet element 52.

It will be apparent to those skilled in the art from the foregoing description of our invention that various improvements and modifications can be made in it without departing from its true scope. The embodiments described herein are merely illustrative and therefore should not be viewed as the only embodiments that might encompass our invention.

What is claimed is:

1. A photographic film assemblage comprising:
   - a plurality of negative sheet elements arranged in a stacked relation with each such sheet element having a photosensitive layer and a leading end with a pocket projecting from one side of said leading end for engagement by force transmitting means, for movement therewith; and
   - a lighttight cassette for enclosing said plurality of negative sheet elements, said cassette having a withdrawal opening therein wherein the leading end of each of said stacked sheet elements is adapted to be successively aligned with said withdrawal opening to thereby enable said pockets on the leading ends thereof to be engaged by force transmitting means for the sequential extraction of each stacked negative sheet elements therethrough.

2. A negative sheet element assemblage of a self-developing peel-apart film unit comprising:

a carrier sheet having a leading end, a trailing end and a pocket formed on said leading end for engagement by force transmitting means for movement therewith, and a photosensitive sheet having a leading end, a trailing end, a photosensitive side and a non-photosensitive side, with the leading end of said non-photosensitive side being attached to said carrier sheet and the trailing end thereof being unattached thereto, and with the leading and trailing ends of said carrier sheet extending beyond said photosensitive sheet.

* * * * *